US008386595B2

(12) United States Patent
Mandre

(10) Patent No.: US 8,386,595 B2
(45) Date of Patent: Feb. 26, 2013

(54) METHOD AND SYSTEM OF SECURING DATA OVER NETWORKS

(75) Inventor: Sateesh Mandre, Bangalore (IN)

(73) Assignee: Unisys Corporation, Blue Bell, PA (US)

(*) Notice: Subject to any disclaimer, the term of this patent is extended or adjusted under 35 U.S.C. 154(b) by 250 days.

(21) Appl. No.: 12/961,031

(22) Filed: Dec. 6, 2010

(65) Prior Publication Data

US 2012/0102143 A1    Apr. 26, 2012

(51) Int. Cl.
    G06F 15/173    (2006.01)
(52) U.S. Cl. ........ 709/223; 709/217; 709/224; 713/151; 713/164; 726/3; 726/24
(58) Field of Classification Search .............. 709/217, 709/203, 223, 224, 229; 726/1, 3, 15, 24, 726/25; 713/151, 152, 153, 164
    See application file for complete search history.

(56) References Cited

U.S. PATENT DOCUMENTS

| 6,041,123 | A * | 3/2000 | Colvin, Sr. ............. 713/153 |
| 6,939,422 | B2 * | 9/2005 | Moulin et al. ............ 156/71 |
| 7,398,315 | B2 * | 7/2008 | Atkinson et al. ........... 709/227 |
| 7,730,528 | B2 * | 6/2010 | Chun et al. .............. 726/12 |
| 8,245,081 | B2 * | 8/2012 | Colbert et al. ............ 714/38.1 |
| 8,281,122 | B2 * | 10/2012 | Durham et al. ............ 713/152 |
| 2002/0184527 | A1 * | 12/2002 | Chun et al. ............ 713/201 |
| 2003/0028825 | A1 * | 2/2003 | Hines .................. 714/37 |
| 2005/0060583 | A1 * | 3/2005 | Lin .................... 713/201 |
| 2007/0239700 | A1 * | 10/2007 | Ramachandran ........... 707/5 |
| 2008/0016552 | A1 * | 1/2008 | Hart .................... 726/3 |
| 2009/0022319 | A1 * | 1/2009 | Shahaf et al. ............ 380/278 |
| 2010/0058060 | A1 * | 3/2010 | Schneider ............... 713/171 |
| 2010/0223457 | A1 * | 9/2010 | Durham et al. ........... 713/152 |
| 2012/0144187 | A1 * | 6/2012 | Wei et al. ............... 713/152 |
| 2012/0240185 | A1 * | 9/2012 | Kapoor et al. ............ 726/1 |

* cited by examiner

Primary Examiner — LaShonda Jacobs
(74) Attorney, Agent, or Firm — James E. Goepel

(57) ABSTRACT

Methods and systems described herein can secure and deliver data over a network. A recipient computer requests a human-readable report from a transmitter computer that initiates a software application to generate a report using data from a backend database. In the application layer, the combination of the report and data is parsed and certain components are replaced to form multiple derived packets of the random strings, the replaced strings, and the combined unaltered string with random strings. The replacement is performed in a pre-determined order that can be a mathematical or logical function. The derived packets are encrypted at the application layer. Further, the receiving computer, in the application layer, decrypts the packets, then finds and replaces the random strings in the combined derived packet, thereby recreating the human-readable report.

10 Claims, 7 Drawing Sheets

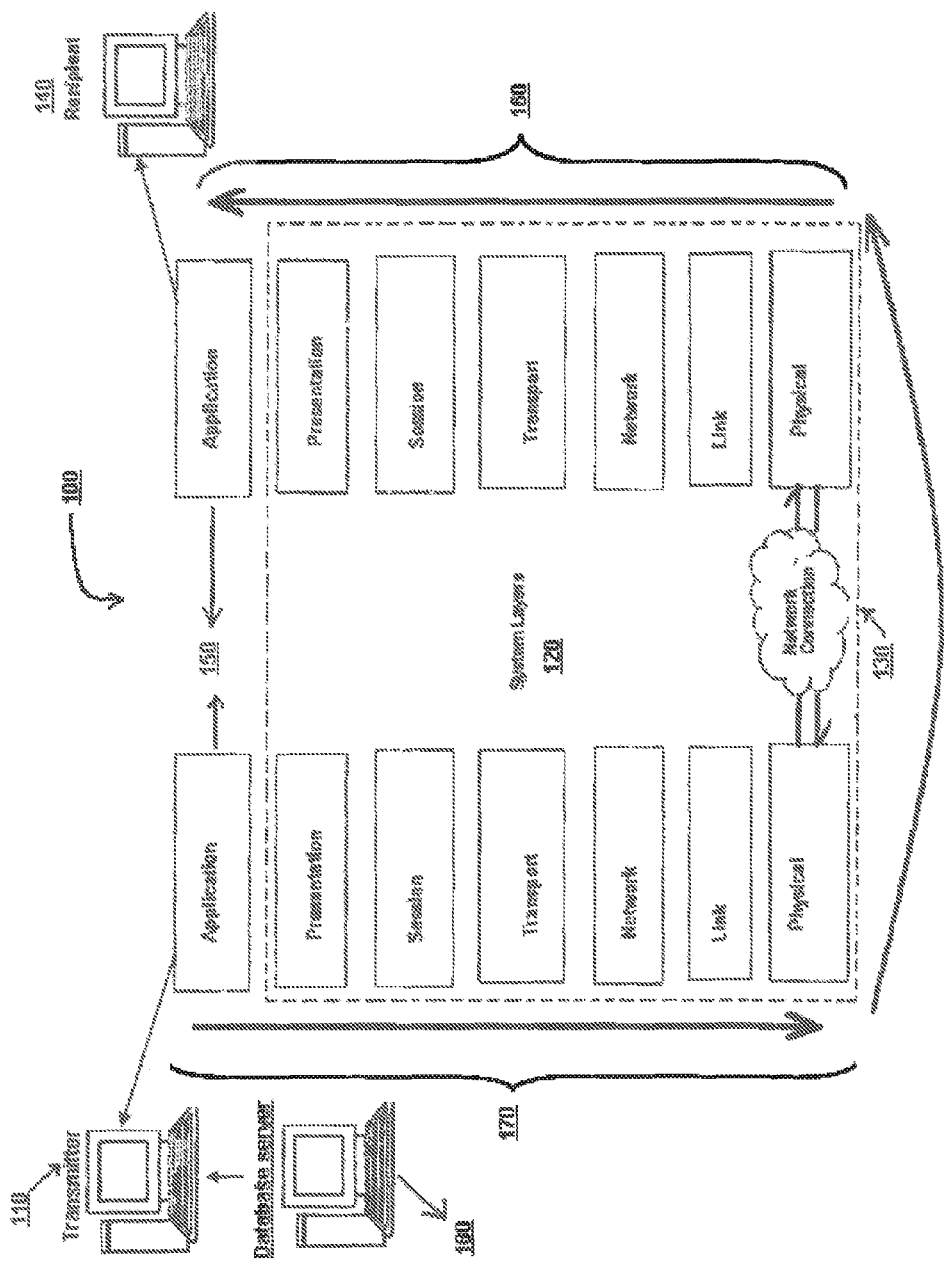

Dear Customer,

Please find attached your CompanyName Bill for,

CompanyName Number: 99720005656 —— 205
Account Number: 105-101577712
Bill Number: 2123875O3
Bill Period:02-Mar-2010 to 02-Apr-2010 —— 210

Your CompanyName email bill is protected by a unique password, SMS 'ebill password' to 121 from your CompanyName Mobile to get your password.
E Bill Password remains the same for every E Bill sent month on month. Kindly remember that the password is case sensitive and should not include any special characters.

Please make crossed Check/DD/Pay Order in favor of CompanyName Account Number-(CUSTOMER ACCOUNT NO)

Dear 1,

Please find attached your 2 for,

2 Number: 3
Account Number: 4
Bill Number: 5
Bill Period:6 to 7

8 9 10 is protected by a 11, SMS 12 to 13 from your 14 Mobile to get your 15. E Bill 16 remains the same for every E Bill sent 17. Kindly remember that the 18 is case sensitive and should not include any 19.

Please make crossed Check/DD/Pay Order in favor of 2 Account Number- (CUSTOMER ACCOUNT NO)

METHOD AND SYSTEM OF SECURING DATA OVER NETWORKS

TECHNICAL FIELD

The present invention relates generally to a method and system of securing and delivering data over a network of computing devices.

BACKGROUND

A network architecture model or simply, a network, is a collection of computer devices that are networked together and capable of communicating with each other directly or indirectly (e.g., Local Area Network or LAN and Wide Area Network or WAN). The internet is an example of a WAN comprising predominately remote computing devices. Transmission of data from one device to another occurs over these networks and is often encrypted to protect the information from being read by unintended individuals like hackers or by automatic malicious software codes.

Computing devices are connected across networks using various methods including wired cables (e.g., twisted pair, coaxial and optical fibers) or wireless high frequency signal waves (e.g., IEEE 802.11 radio signal standards, satellite signals, microwaves, cellular systems and Bluetooth). Such networks can utilize a network architecture defined by topology, or the way the computing devices are connected; scale, or the number of computing devices (e.g., LAN, WAN, personal area networks and virtual private networks); or a functional relationship (e.g., client-server and peer-to-pea connections).

The network architecture also defines the method by which the devices communicate, for example, the Open System Interconnection (OSI) and the Internet Protocol Suite (TCP/IP) methods. Each of these methods define a set of rules or protocols that govern how information is presented, packaged, represented, encrypted, addressed and transported. The Open System Interconnection (OSI) model has seven layers including a physical layer that defines the physical intermediate devices in a network and the signals and media within them, a link layer that defines the interconnection method within the network (e.g., Ethernet and Medium Access Control (MAC) sub-layer), a network layer that controls the routing of data, a transport layer that defines the rules for the transfer of data via packets across the networks, a session layer that establishes sessions between the sender and receiver of the data by checking permissions and authentication, a presentation layer that attends to the data format (and syntax) across device and network platforms and is the basis for an application layer, which provides the protocols for interface, parsing, and packaging of data for transmission.

Data encryption can be done at various network architecture layers, including the application layer, which receives the initial human-readable data from the user for transmission across the network. One data encryption method uses certificates (containing keys) for encryption and decryption at the client (user) and server (host) machines. Alternatively, some encryption methods utilize a new certificate sent from the server after a secure connection is established and this new certificate contains the decryption key for the following data. The secure connection is established at the transport layer using Transport Layer Security (TLS) or Secure Socket Layer (SSL), which provides keys for information exchange at the lower level in the network than the application layer. Further encryption methods include session layer encryption, e.g., using Secure Shell (SSH) to create a tunnel for continuous exchange of encrypted data rather than using multiple packets via a continuously changing negotiation of cryptographic algorithms.

These methods are complex and like any encryption method, may still be vulnerable to hacking attempts and the data is subject to interception as it is sent in continuous packets. Additionally, although some of these conventional methods may not involve high level data manipulation methods, network encryption methods can have significant drawbacks that are common to most encryption methods including lack of speed (latency), complexity, and reliance (jitter) due to packet arrival times.

SUMMARY OF THE INVENTION

The methods and systems described herein attempt to overcome the drawbacks discussed above by securing the user data at the Application layer of a network architecture, e.g., by parsing the information package into discrete parts, replacing certain data components based on the parsing result with random strings in a pre-determined order, thereby creating derived packets of the random strings, the replaced data strings, and a combination of the random strings with the unaltered strings. Each of these derived packets are encrypted and then transmitted over a network. The recipient network hosts a recipient computing device that will apply the above method in its application layer to reverse the parsed, replaced, and encrypted data from the derived packets back into an information package for use in a human-readable report.

In one embodiment, a method for securing data in an application layer of a network architecture comprises receiving, in the application layer on a transmitter computing device, a information package in the form a human-readable report; parsing, in the application layer on a transmitter computing device, the information package into a plurality of discrete components, wherein at least one of the components can be grouped with another component, the components sharing a common contextual relationship; replacing, in the application layer on a transmitter computing device, a first parsed group of components from the information package with random strings, wherein the components are replaced by the random strings in a pre-determined order; creating, in the application layer on a transmitter computing device, multiple derived packets, wherein the random strings forms one derived packet, the replaced first parsed group of components forms another derived packet and the combination of the inserted random strings and the remaining unaltered strings forms a third derived packet; encrypting, in the application layer on a transmitter computing device, each of the derived packets; and transmitting each encrypted derived packet from the transmitter computing device over a network to a recipient computing device.

In another embodiment, a method for rendering secured data in an application layer of a network architecture, comprises receiving, in the application layer on a recipient computing device, encrypted derived packets from the network; decrypting, in the application layer on a recipient computing device, the derived packets; searching, in the application layer on a recipient computing device, through the decrypted derived packets to identify a random derived packet containing random strings, an original derived packet containing original data strings in a pre-determined order and a combination derived packet containing the combined random strings and remaining unaltered strings; parsing, in the application layer on a recipient computing device, the combination derived packet to find the random strings listed in the random derived packet; and replacing, in the application layer on a recipient computing device, the random strings with the original data strings from the original derived packet after resolving the pre-determined order of replacement, thereby creating a human-readable report.

In yet another embodiment, a method for securing data in an application layer of a network architecture, comprises receiving, in the application layer on a transmitter computing device, a information package in the form a human-readable report; parsing, in the application layer on a transmitter computing device, the information package into a plurality of discrete components, wherein at least one of the components can be grouped with another component, the components sharing a common contextual relationship; replacing, in the application layer on a transmitter computing device, a first parsed group of components from the information package with random strings, wherein the components are replaced by the random strings in a pre-determined order; creating, in the application layer on a transmitter computing device, multiple derived packets, wherein the random strings forms one derived packet, the replaced first parsed group of components forms another derived packet and the combination of the inserted random strings and the remaining unaltered strings forms a third derived packet; encrypting, in the application layer on a transmitter computing device, each of the derived packets; transmitting each encrypted derived packet from the transmitter computing device over a network to a recipient computing device; receiving, in the application layer on the recipient computing device, encrypted derived packets from the network; decrypting, in the application layer on the recipient computing device, the derived packets; searching, in the application layer on the recipient computing device, through the decrypted derived packets to identify a random derived packet containing the random strings, an original derived packet containing the replaced first parsed group of components is a pre-determined order and a combination derived packet containing the combined random strings and remaining unaltered strings; parsing, in the application layer on the recipient computing device, the combination derived packet to find the random strings listed in the random derived packet; and replacing, in the application layer on the recipient computing device, the random strings with the original data strings from the original derived packet after resolving the pre-determined order of replacement, thereby re-creating the human-readable report.

BRIEF DESCRIPTION OF THE DRAWINGS

The accompanying drawings constitute a part of this specification and illustrate an embodiment of the invention, and together with the specification, explain the invention.

FIG. 1 illustrates a system architecture according to an exemplary embodiment.

FIG. 2 illustrates a report with data according to an exemplary embodiment.

FIG. 5 illustrates a method of stripping a report of its confidential information according to another exemplary embodiment.

DETAILED DESCRIPTION

Figure 3:
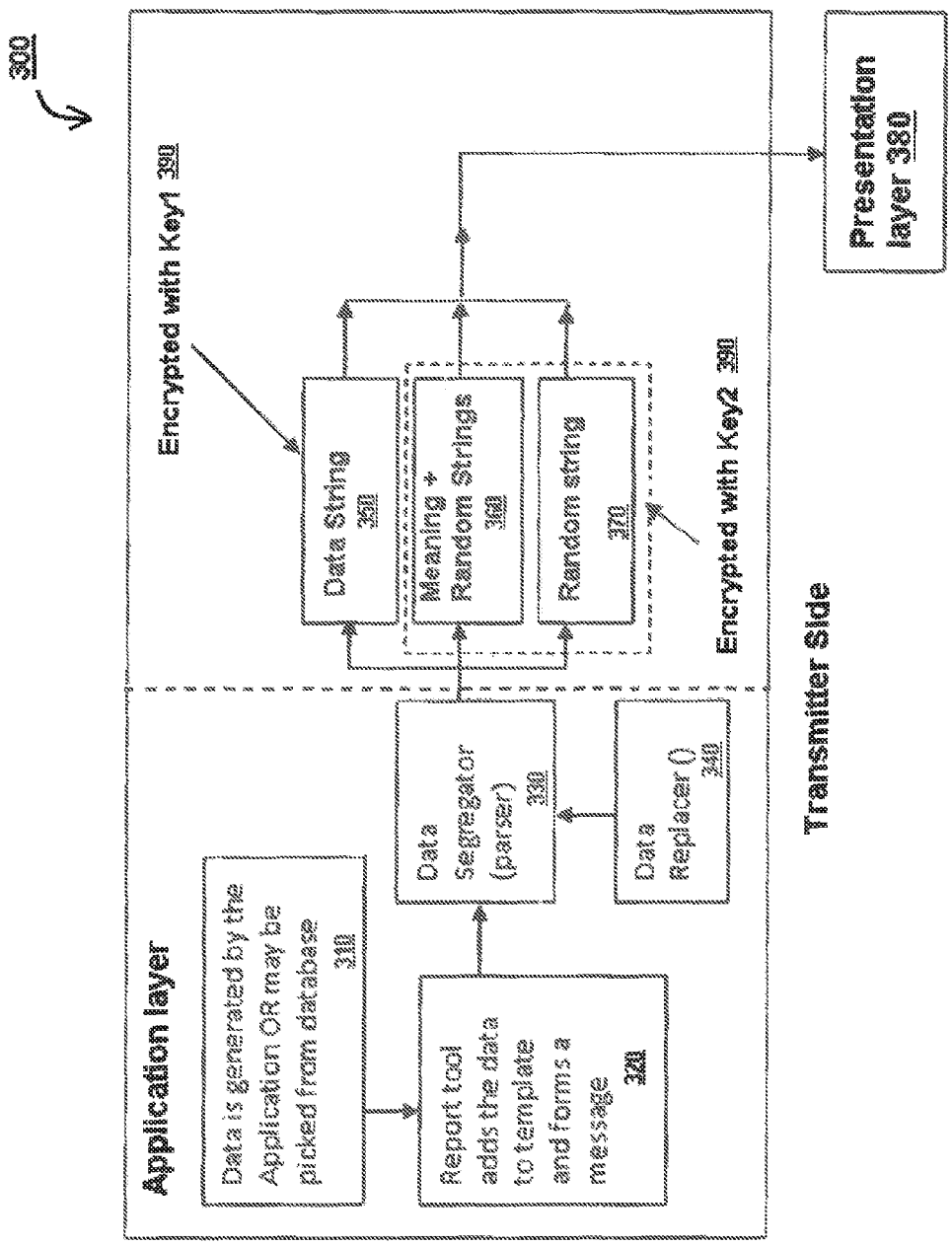
FIG. 3 illustrates a method for rendering secure data in a network layer according to an exemplary embodiment.

Reference will now be made in detail to the preferred embodiments of the present invention, examples of which are illustrated in the accompanying drawings.

Network security is a significant issue where highly confidential information is transmitted between remote computers across large distances. As data enters an internal network (or intranet) from an external network (like the Internet), a network architecture model having several layers of security will scrutinize the data. Some network architectures may employ one or more gateways as an interface between the internal network and the Internet. Such gateways typically deal with lower level networking functions, such as impedance matching, protocol translations, rate conversion, and the like (i.e., work which primarily involves the network layer of the OSI network stack, described in more detail below). Many network architectures also employ one or more routers, which also handle lower level work in the network, including identifying packets on the external network which are intended for computing devices served by the router, network address translations, protocol conversions, and network-level data encryption, such as the creation of a virtual private network ("VPN") between routers on a network. A router's primary responsibility is the receipt and retransmission of derived packets to and from the computing devices served by the router. In a very small transmitter or recipient network with a single computing device, the single device can act as the router and/or gateway. For a larger internal network with a plurality of computing devices, the router and/or gateway can be one of the network devices while the other network devices act as its clients. In many network architectures, from the point of view of an external network, the internal network served by the router or gateway can appear to be a single computing device. When a transmitter computing device wishes to send data to a recipient computing device, such as, without limitation, data generated from computer software applications such as the Microsoft® Suite (e.g., Office®, PowerPoint®, Access®, Excel®), is broken down into a plurality of derived packets. These individual derived packets are then sent across a network from the sender to a recipient. By way of example, without limitation, some computer software applications generate reports by combining a template with data from a database for the purposes of mass communications (e.g., an application like Microsoft Word® can be combined with Microsoft Access® to plug in data from Access into a template, which is subsequently printed and/or E-mailed to the intended recipient(s)).

In some embodiments, the resulting mailer can be converted to a web-based format or at least portions of the mailer can be dynamically created using a web-based language. By way of example, without limitation, source code and/or scripts written in one or more of the following languages may be used: HTML, JAVA, JavaScript, VBScript, or Flash for presentation and/or client side logic; PHP, JAVA, Perl or Python for server-side application logic; and ORACLE, MASH, SQL Server, or MySQL for database storage and access. The exemplary combinations of these web-enabling applications ensure that data is available for access as long as a network exists between the hosts for each of these applications, the data, and the client.

In some embodiments, it can be advantageous for the data being transmitted between the client and the server to be encrypted. Encryption can reduce the likelihood that the data will be easily intercepted. As described above, conventional encryption operates at or near the network layer of the Open System Interconnection ("OSI") network stack. That is, the entire communication channel between the client and server is typically encrypted, such that all data transferred between the computing devices is secure. While such communications can result in a high level of security, their implementation can require significant computational resources for their effective implementation. By way of example, without limitation, recent research has shown that the keys which are used to encrypt certain types of communications can be generated (e.g., via brute force algorithms) in "reasonable" periods of time. Once such keys are obtained, they can be used to decrypt any data encrypted by the keys, including, without limitation, wireless network communications, virtual private network communications, and the like.

By way of background, FIG. 1 illustrates the conventional, seven layer Open System Interconnection (OSI) network stack model 100. Unlike conventional encryption techniques, the system and methods described herein operate predominately at the opposite end of the OSI stack; that is, they operate predominately in the application layer 150. The application layer 150 is the first, and highest layer, and is generally seen as being closest to the user. Therefore, the application layer 150 is typically seen as being of high functionality based on the user requirements of the particular software application.

In some embodiments of the OSI stack, the application layer can receive data from a software application in human-readable format for easier manipulation. As described in more detail below, the methods and systems described herein can, within the application layer, manipulate the data to be transmitted from the server to the client based on the actual information, then encrypt the data and transmit it to the recipient device(s). The receiving device(s) can reverse this process in the application layer and then provide the completed information package back to the intended software application.

In an exemplary embodiment, the process of manipulating human-readable data can include, without limitation, parsing the data to identify relational information like numbers and words having a certain contextual relationship, removing this identified information, and treating the removed data as a separate set of data to be transferred to the receiving computer. By way of example, without limitation, the original, human-readable data may comprise a report from a software application. The data in the human-readable format from the report may be referred to herein as a information package, which is then broken down by parsing into discrete components, herein referred to as derived packets. The term report includes, but is not limited to, web based reports, word processor documents, presentation files, spreadsheets, e-mails and other types of files that contain textual or other human-readable information.

In one embodiment, a user requests a report from a remote computing device. The computing device uses a template with a web-based application source code and requests data from a back-end database server. The source code contains calling functions that indicate the locations in the template that are intentionally left blank for plugging in the data from the database server. The completed report, which is a combination of the template and database data is then parsed into its components, which can be accomplished by grouping certain components that have a common contextual relationship, e.g., separating and/or combining verbs, nouns, and numerical data based on grammatical rules in the English language, or other appropriate language. This relationship can be based on the nature of the information package (i.e., initial report) to be parsed, such as a text message, a report having text and numerical values or even statistical tables.

When the parsing algorithm recognizes the language or structure of the information package, the algorithm can dynamically choose to parse groups based on language or other contextual relationships. A parsing algorithm creates groups of each of these relational components and passes the group information to a replacement algorithm. The replacement algorithm replaces certain groups or its individual components with random strings. The algorithm creates each replaceable component but keeps track of this replacement by a logical relationship or a mathematical function. In another embodiment, by way of an example, if a first numerical has been removed from the template, the replacement algorithm uses the set of natural numbers, e.g., "1" in the place of the first replacement; for a second numerical, the number "3" is used; for the first noun that will be replaced from the template, the even numerical "2" is used. As a result, the components removed from the template can be stored in a separate derived packet in that particular order—even numbers and odd numbers, i.e., 1, 3 and so on for the numerical replacements, and 2, 4 and so on for the noun replacements. The replacement algorithm strips the original derived packet (i.e., the initial report) by placing randomized data strings in the location of the replaced components to form another derived packet of unaltered strings and random strings. The randomized string stored in the order of the natural number system represent the mathematical order for replaced strings with a contextual relationship. In another embodiment, more complex replacement can use random strings in the form of Greek notations (e.g., $\Theta$, $\alpha$) or other symbolism to replace certain components from a certain group and other notations for other groups.

The derived packets from the original information package (i.e., the initial report) now include a first derived packet generated from the original report, which is a combination of some unaltered strings and the replaced random strings, a second derived packet containing the original information that was replaced, and a third derived packet containing the random strings. Further, words in the original information package can be further divided into nouns, verbs, etc., depending on the language, numerical values, and any other differentiating information from a contextual relationship group that can be established. The parsed derived packets are ready for transmission. Before transmission, however, each derived packet can be encrypted using different keys for added security. The encrypted derived packets are then transmitted together or separately. Even if the packets are sent together and a hacker attempts to obtain the information in this data stream, the data is too complicated to easily regenerate. The hacker would need the pre-determined order (mathematical function or logical relationship) information, the encryption keys, and the nature of the pre-determined order to be able to regenerate the original message.

In another embodiment, the logical function could be generated by replacing data components with random strings, whereby the random strings are placed in a certain order that is logically related to the order of the replaced data component. This logical relationship function is a type of inverter function. The software applications on the transmitter and recipient computing devices share a set of all mathematical and logical functional relationships that can be identified by simple coding in the first derived packet. Because this manipulation is done in the application layer, the relationship between components can be more easily established than dealing with complex machine codes.

There are various software applications capable of functioning in the application layer, e.g., e-mail systems, file transfer, newsgroups, host sessions, as well as assemblers, file management tools, operating systems, and application utilities. The application layer 150 may use a protocol such as HTTP (Hypertext Transfer Protocol). In some embodiments, online reports created via web based languages, such as, without limitation, HTML (Hypertext Markup Language) and JAVA, may be secured at the application layer 150 for additional security.

The subsequent layers are collectively referred to as system layers 120 and form the backend of the Transmitter computing device 110, which can also be a gateway for a small transmitter network, as discussed above. The transmitter computing device 110 can also function as a database server, but more commonly, a database server 180 is independently located and coupled to the transmitter computing device 110, as illustrated in the figure. The network layers 150 and 120 on the transmitter 110 side of FIG. 1 form the transmitter network 170 while the network layers 150 and 120 on the recipient 140 side form the recipient network 160. The recipient computing device 140 can be the gateway of the recipient network 160. The physical layer of the network architecture 100 contains the physical network connection 130 that includes protocols and devices that provide the electrical, mechanical, procedural and functional specifications of the network structure. The physical network connection 130 can include devices such as hubs, repeaters, fiber optic cables, and coaxial cables. Some of these devices can convert signals (depending on the media) within the network and with other devices outside the network using industry standard protocols coded in embedded software (or firmware) within the devices. For each of the transmitter and recipient computing devices, the first network device within the computing device's network is usually a hub, concentrator, repeaters, or even a router, depending on the size of the internal network (intranet) and whether the intranet commences from this device to the computing devices within the network. The gateways and routers from two intranets usually negotiate connections over an external network, like the internet, at the transport and network layer of the network architecture.

The application, presentation and session layers within the system layer 120 may be referred to as the "upper" layers of the OSI model and can interface with the user to generate the data for the network, A gateway device (such as a computing device like a personal computer) is a network component of the upper layers of the OSI model. Data can be generated from sample applications including word processors like Microsoft Word® and e-mail clients (e.g., Outlook® and Thunderbird®), This data is collected by the application layer, which, by way of example, could be the network client service software on the transmitter computing device. Some or all of the application layer data can be human-readable and therefore capable of being grouped by a contextual relationship shared within the discrete components of the data. Error recovery and Quality of Service (QoS) refer to metrics used to predict, measure and ensure data quality within the application layer. The presentation layer identifies the format and syntax that informs the recipient of the type of data. Operating system differences are predominant in this layer, e.g., the different formatting structure in Windows®, Ubuntu®, and Apple® systems. Thus, for example, Data in ASCII (common to the Windows PC computing device) may need to be converted to EBCDIC for an IBM mainframe computing device. The connection between transmitter and recipient computing devices is initiated at the session layer. The connection process can be an extension of the client network software that enables networking on the individual computing device.

Exemplary transmitter and recipient computing devices 110, 140 include personal computer (PC) devices that function with the Windows operating systems (e.g., Windows 7®, Windows Vista®, XP®, etc), LINUX, UNIX or other such operating systems. Exemplary computing devices 110, 140 also include Apple® Computer devices using an Apple Operating system (e.g., MAC OS X Leopard®, Mac OS X Tiger®, Snow Leopard®, etc.), or other computers, including one or more network servers running any other operating systems such as the MCP® and OS2200® operating systems developed and distributed by Unisys Corporation; Ubuntu®, developed and distributed by Canonical Ltd., the z/OS, z/VSE, and z/VM Hypervisor® operating systems distributed by IBM Corporation; and Novell Netware® and SUSE Linux®, distributed by Novell. Further examples of computing devices 110, 140 include tablet computers, like the Apple iPad; mobile phones, personal data assistants, and smart phones, such as the Apple iPhone, Google's Android phones, Research In Motion's BlackBerry devices, and the like; Sony's Play Station 3 ("PS3"), Microsoft's X-Box, and Nintendo's Wii gaming consoles; and online TV streaming devices such as Apple TV, Google's Android TV, and the Boxee Box; and set top boxes including DVRs. Many of these computing devices 110, 140 are capable of remote networking with other networking devices in the same or different categories. Some of these computing devices 110, 140 may have firmware (embedded software) that is essentially an operating system capable of performing the various functions of the OSI network architecture or a similar architecture automatically upon certain user requests.

The recipient computing device can reverse the processes from the transmitter computing device at the application layer, thereby recreating the data it received. The physical layers 130 at the recipient network 160 receive the data signals and convert it to derived packets. The Data layer converts the packets to addressed packets for delivery that can be recognized by the intended recipient device 140 within the recipient network 160 in the application layer 150. The transport layer, shown in layers 160 on the recipient gateway device 140, reassembles the data that has been broken down to packets, ensures that the packets are in correct order, and then acknowledges receipt of the data. The application layer 150 on the recipient computing device 140 decrypts and parses the data and reassembles it hack to its initial state. As discussed previously, if the recipient network 160 is a single computing device network, then the recipient computing device 140 can act as the gateway and/or router.

FIG. 3 illustrates an exemplary embodiment in which a transmitter software application has components 310, 320, 330, 340 that function in the application layer of the recipient and transmitter networks 170, 160. In another embodiment, the functions of components 310, 320, 330, 340 can be performed by separate or independent sub-applications whereby each component forms a sub-application and each sub-application is resident in the application layer of the recipient network, transmitter network, or computing device. In one embodiment, a software application has the capability to generate the data to function as the transmitter data application in direct contact with a gateway and a router. In some embodiments, an independent computing device can contain all components of a computing device including, without limitation, a processor, computer readable storage media (e.g., hard disk, random access memory or solid state storage), an operating system, interface hardware (e.g., mouse, keyboard and screen), and additionally, all components of a networking device, e.g., router hardware and firmware capable of parsing and encryption, multiple ports to function as a hub or a switch, and repeaters. In some embodiments, one or more software applications are stored on the computer readable storage media. The software applications comprise a set of instructions that, when executed by the processor, cause the computing device to perform certain functions.

FIGS. 2 through 5 depict exemplary methods of securing data on networks within the application layer 150 of an OSI network architecture. By way of example, without limitation, a use on a recipient computing device 140 may request a report from a network-based application that has its core backend database and report generation on the database server 180 and transmitter computing device 110. Referring to FIG. 2, the transmitter computing device 110 generates a report template 200 on a network-based software application resident on the device 110. Examples of a network-based software application (sometimes referred to as a "web app") resident on the transmitter computing device include stand-alone software applications like word processors, cloud-based applications like Google Documents, and HTML templates, which are capable of accessing backend databases on a database server 180 to plug data into the template reports 200, as illustrated in FIG. 2.

In the illustrated embodiment, the report template has pre-defined locations for database data 205, 210 (shown in the bolder font) and requests such data from a backend database server 180. This data is to be transmitted to the recipient computing device and includes the template and backend data that is fed to the application layer 150 on the transmitter computing device side 170. The data parser 330 has an algorithm capable of parsing the information package 330 into groups and replacing the parsed data with random data strings from the data replacer function 340. The data is parsed into its contextually related components, thus forming a parse grouping 400, shown in FIG. 4. The exemplary parse group shown in FIG. 4 uses relational components such as identity information, phone numbers, and billing total, and the data in the report is classified based on the type of the component. The exemplary embodiment shows the initial text 410 for secure transmission. The text is a combination of "meaning" 420 (provides an English language context to the data) and data strings 430 (company name, account number, and date) from a database that forms the report 410.

Figure 6:
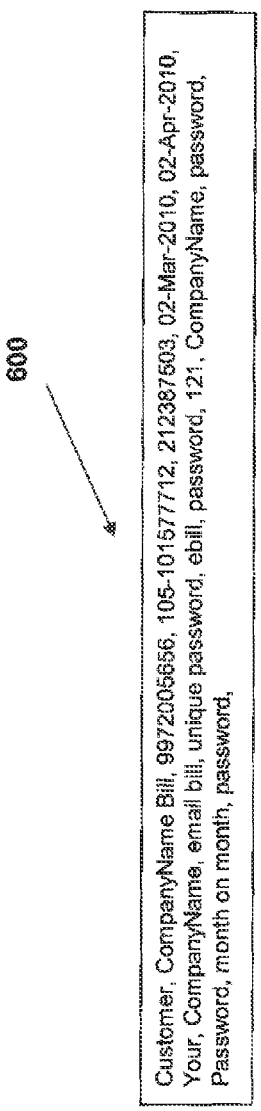
FIG. 6 illustrates a method packing confidential information into a derived packet according to another exemplary embodiment.

The data received in the application layer is still in the form of a human-readable report and can be broken down into its relational components, e.g., data strings 430. A meaning group for the meaning group 420 has designated spaces identified by a pre-determined order of numbers using a mathematical function, such as natural numbers in order of each component removed. Although the illustrated embodiment shows stripped components containing database data, it should be noted that further stripping can also remove certain texts based on a grammatical or other relationship. For example, in the English-language data illustrated in FIG. 4, nouns including "bill" and "account" as well as the adjective "Dear" can be removed from the meaning group 420 to form additional data strings. Similarly, the data group 430 can be further divided where the each data string is replaced by more random strings for added complication. The mathematical function or logical relationship may be pre-determined between the both the transmitter and recipient software applications and the identifier for the pre-determined function or relationship can be provided as a code in the first line of the random derived packet. The replacer component 340 can generate random data strings 440. The replacer component 340 then replaces entire words or phrases, or in some embodiments individual characters in the data group 420 with random variables from 440. An exemplary stripped version of the report from FIG. 2 is illustrated in FIG. 5 and the corresponding data string illustrated in FIG. 6. As illustrated in the exemplary embodiment of FIG. 5, the stripped data can be stored in order of its occurance in the report in FIG. 2. The order provides the required relevance and relationship to the data and avoids the requirement for additional relationship information. In other embodiments, this order can be pre-determined by a set of such relationships in both the transmitter and recipient software applications or devices. By way of example, without limitation, the order may be determined by a linear congruential shuffle algorithm which uses certain constraints (e.g., attributes of the data, or data negotiated out of band between the transmitter and the recipient). Also, the order is identified by a notation on the random strings derived packet 370 to inform the recipient software as to the order used.

Figure 4:
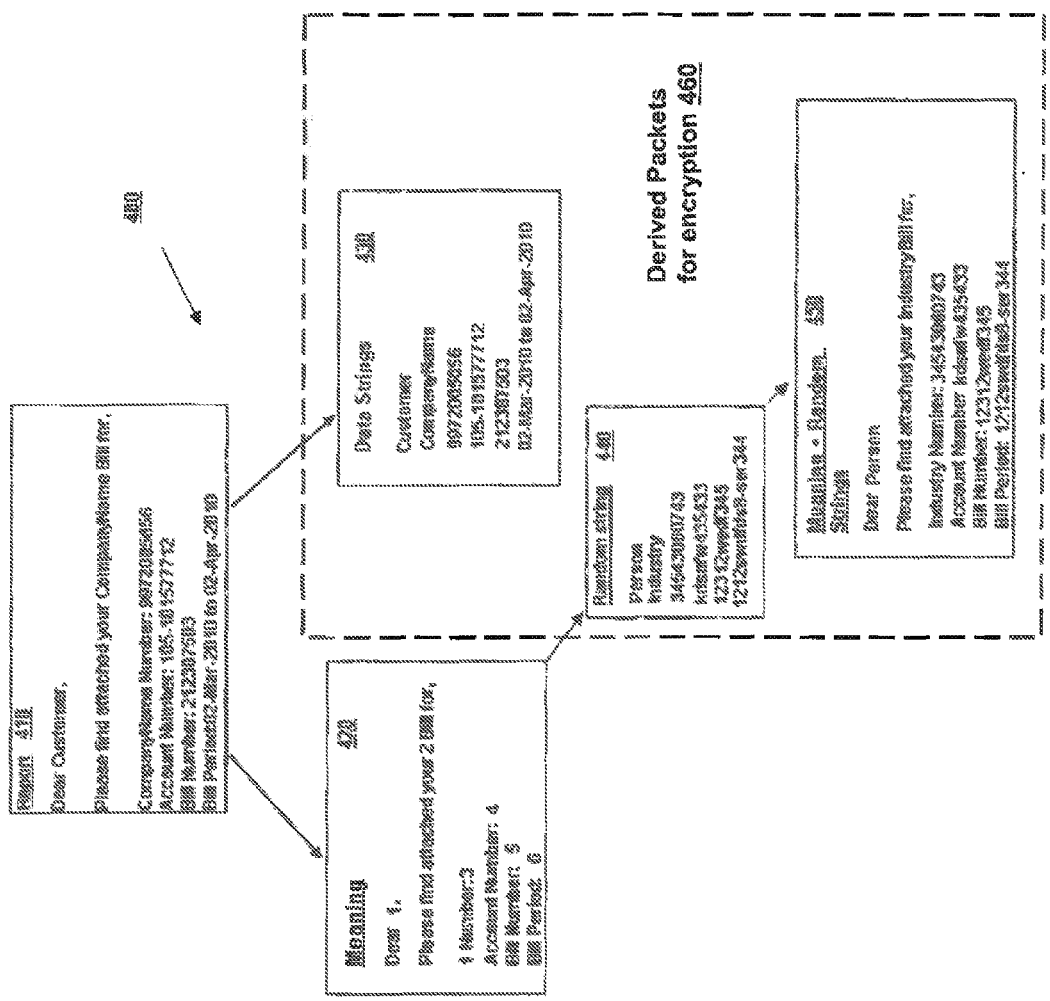
FIG. 4 illustrates a method for generating a parse grouping according to another exemplary embodiment.

FIG. 4 illustrates the three different derived packets for transmission and encryption 460: random strings 440, combination of meaning and random strings 450, and data strings 430. These packets can be encrypted individually with their own keys, or in some combination, e.g., Key1 and Key2 390. These encrypted derived packets can be transferred from the application layer to the network layer of system layers 120, where conventional encryption may also be employed depending on the type of architecture. In another embodiment, the transmitter software application can be a cloud computing based application on a remote computing device, where the application contains two sub-applications that perform the data parsing and data replacing functions and can work with the sub-application that performs the encryption.

Figure 7:
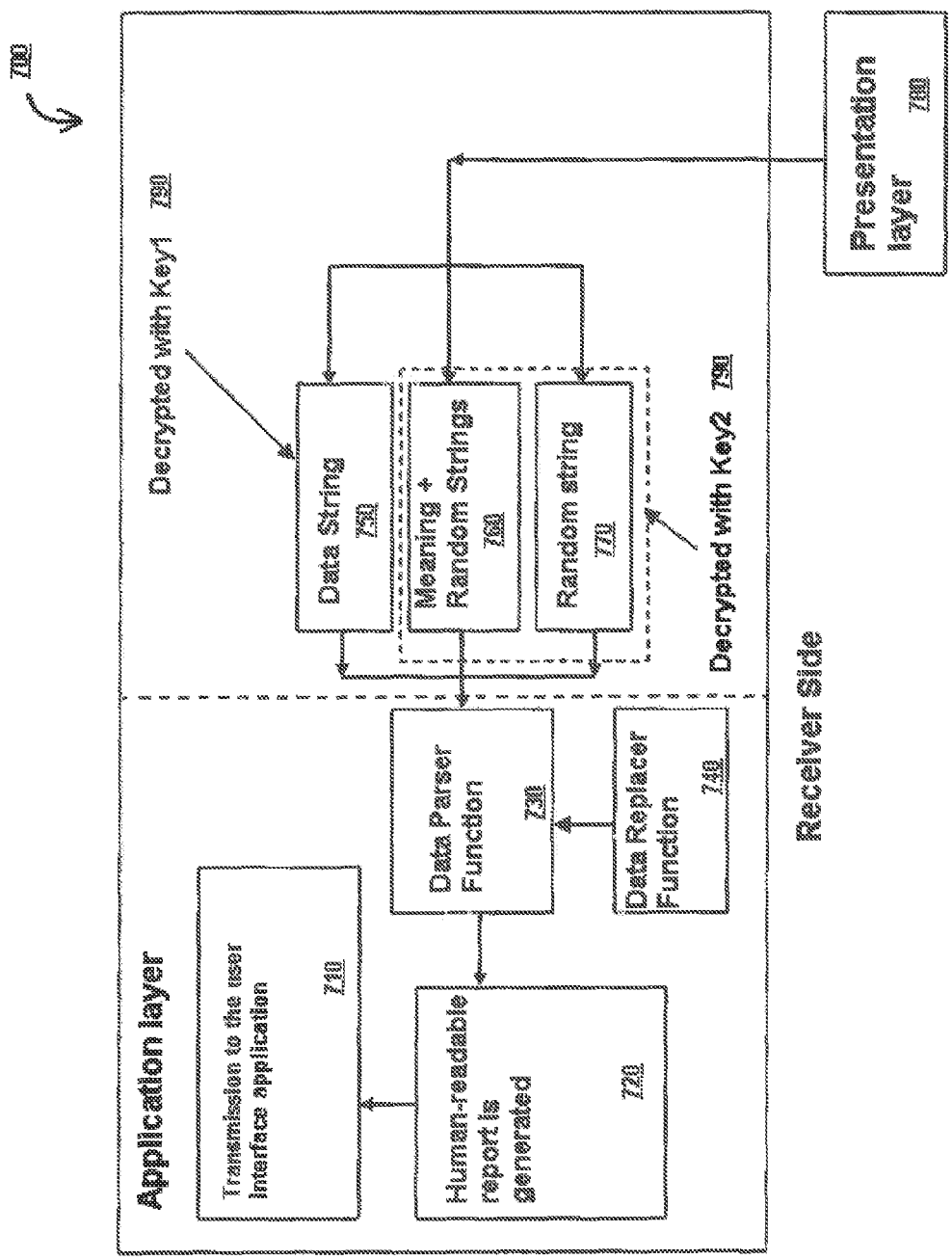
FIG. 7 illustrates a method receiving confidential information according to an exemplary embodiment.

Once the data is received by the recipient computing device, the lower levels of the network stack decrypt any data applied by the lower levels of the transmitting computing device's network stack, recompile the derived packets into data useful to the higher levels of the stack, and the like. The compartmentalized, encrypted data from the transmitter computing device's application is then percolated up to the application layer 150 of the recipient network stack 160, and the received derived packets are rendered using a reverse process of the method described above. The software application on the recipient device 140 uses a decryption algorithm to decrypt the application layer encryption on each derived packet received. As illustrated in FIG. 7, the parsing algorithm 730 analyzes the derived packets, identifies the random data strings packet 770, identifies the combination derived packet 760 of random data strings and unaltered strings, and identifies the replaced derived packet 750 containing the replaced data strings. The parser 730 then searches the combination derived packet for each random string from the random data strings packet starting at the first random string. Once the first random string is found in the combination derived packet 760, the string is replaced by the replacer 740 with the first data string from the original derived packet, thereby re-generating the original report. In some embodiments, the replacer 740 uses a simple math function using the natural number order that was pre-determined between the transmitter and recipient applications. The software applications on the transmitter and recipient computing devices share a set of all mathematical and logical functional relationships that can be identified by simple coding in the first derived packet. Because this manipulation is more done in the application layer, the relationship between components is easily established than dealing with complex machine codes.

The embodiments described above are intended to be exemplary. One skilled in the art recognizes that numerous alternative components and embodiments that may be substituted for the particular examples described herein and still fall within the scope of the invention.

What is claimed is:

1. A method for securing data in an application layer of a network architecture, the method comprising:
   receiving, in the application layer on a transmitter computing device, a information package in the form a human-readable report;
   parsing, in the application layer on the transmitter computing device, the information package into a plurality of discrete components, wherein at least one of the components can be grouped with another component, the components sharing a common contextual relationship;
   replacing, in the application layer on the transmitter computing device, a first parsed group of components from the information package with random strings, wherein the components are replaced by the random strings in a pre-determined order;
   creating, in the application layer on the transmitter computing device, multiple derived packets, wherein the random strings forms one derived packet, the replaced first parsed group of components forms another derived packet and the combination of the inserted random strings and the remaining unaltered strings forms a third derived packet;
   transmitting each derived packet from the transmitter computing device over a network to a recipient computing device;
   receiving, in the application layer the recipient computing device, derived packets from the network;
   searching, in the application layer on the recipient computing device, through the decrypted derived packets to identify a random derived packet containing the random strings, an original derived packet containing the replaced first parsed group of components is a pre-determined order and a combination derived packet containing the combined random strings and remaining unaltered strings;
   parsing, in the application layer on the recipient computing device, the combination derived packet to find the random strings listed in the random derived packet; and
   replacing, in the application layer on the recipient computing device, the random strings with the original data strings from the original derived packet after resolving the pre-determined order of replacement, thereby re-creating the human-readable report.

2. The method according to claim 1, wherein the pre-determined order is an order defined by a logical or mathematical function.

3. The method according to claim 1, wherein the pre-determined order is a logical relationship or mathematical formula shared between the recipient computing device and the transmitter computing device.

4. The method according to claim 1, wherein the human-readable report is selected from the group consisting of a web-based template with data, a document, a spreadsheet, a presentation, an e-mail, and a text file.

5. The method according to claim 1, wherein the method for securing data in the application layer on the transmitter computing device and the recipient computing device is a function of a software application resident on each of the computing devices.

6. The method according to claim 1, wherein the common contextual relationship used in the parsing function is chosen based on the content of the information package to be parsed.

7. The method according to claim 1, wherein the common contextual relationship used in the parsing function is chosen based on the grammar of the language used in the information package components.

8. The method according to claim 1, wherein file common contextual relationship used in the parsing function is chosen based on the input parameters that establish the context relationships.

9. The method according to claim 1, wherein the random string generation is based on the input parameters from the external world.

10. The method according to claim 1, further comprising:
    encrypting, in the application layer on a transmitter computing device, each of the derived packets; and
    decrypting, in the application layer on the recipient computing device, the derived packets.

* * * * *